(12) United States Patent
Chen (10) Patent No.: US 8,570,303 B2
(45) Date of Patent: Oct. 29, 2013

(54) DISPLAY MODULE

(75) Inventor: Chih-Yen Chen, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 532 days.

(21) Appl. No.: 12/399,037

(22) Filed: Mar. 6, 2009

(65) Prior Publication Data

US 2010/0053118 A1  Mar. 4, 2010

(30) Foreign Application Priority Data

Sep. 4, 2008 (TW) .............................. 97133963 A (51) Int. Cl.
*G06F 3/042* (2006.01)

(52) U.S. Cl.
USPC ......................................................... 345/175

(58) Field of Classification Search
USPC ................... 345/170, 173; 382/124
See application file for complete search history.

(56) References Cited

U.S. PATENT DOCUMENTS

| | | | |
|---|---|---|---|
| 4,924,085 A | 5/1990 | Kato et al. | |
| 6,150,665 A | 11/2000 | Suga | |
| 6,274,861 B1 * | 8/2001 | Zhang et al. | 250/208.1 |
| 6,401,551 B1 | 6/2002 | Kawahara et al. | |
| 6,688,186 B2 | 2/2004 | Chae | |
| 6,829,375 B1 | 12/2004 | Higuchi | |
| 7,181,052 B2 * | 2/2007 | Fujieda | 382/124 |
| 2002/0163601 A1 | 11/2002 | Min et al. | |
| 2004/0211960 A1 * | 10/2004 | Joo et al. | 257/59 |
| 2005/0157911 A1 * | 7/2005 | Iseri et al. | 382/124 |
| 2005/0237291 A1 * | 10/2005 | Aoki | 345/100 |
| 2007/0086634 A1 * | 4/2007 | Setlak et al. | 382/128 |
| 2008/0001885 A1 * | 1/2008 | Yanagisawa et al. | 345/92 |
| 2008/0007541 A1 * | 1/2008 | Eliasson et al. | 345/176 |
| 2008/0159599 A1 * | 7/2008 | Kajihara et al. | 382/115 |

FOREIGN PATENT DOCUMENTS

| | | |
|---|---|---|
| CN | 1451205 | 10/2003 |
| CN | 1503956 | 6/2004 |
| CN | 1820272 | 8/2006 |
| CN | 101034332 | 9/2007 |
| CN | 101038399 | 9/2007 |
| TW | 200705039 | 2/2007 |

OTHER PUBLICATIONS

"1st Office Action of China counterpart application", issued on Jan. 8, 2010, p. 1-p. 7.
"2nd Office Action of China Counterpart Application", issued on Jul. 6, 2010, p. 1-p. 8.
"Office Action of Taiwan Counterpart Application", issued on Mar. 12, 2012, p. 1-p. 7.

* cited by examiner

*Primary Examiner* — Nicholas Lee
(74) *Attorney, Agent, or Firm* — Jianq Chyun IP Office (57) ABSTRACT

A display module includes a display panel and a fingerprint sensor. The display panel includes a display region, a peripheral region next to the display region, an active device array substrate, and an opposite substrate. The fingerprint sensor is disposed in the peripheral region of the active device array substrate of the display panel. Besides, the fingerprint sensor includes a light guide element, a light source, and a photosensor array. The photosensor array is disposed on the active device array substrate. The light guide element is disposed over the photosensor array. The light source is disposed on a side surface of the light guide element or below the light guide element.

35 Claims, 12 Drawing Sheets

DISPLAY MODULE

CROSS-REFERENCE TO RELATED APPLICATION

This application claims the priority benefit of Taiwan application serial no. 97133963, filed on Sep. 4, 2008. The entirety of the above-mentioned patent application is hereby incorporated by reference herein and made a part of specification.

BACKGROUND OF THE INVENTION

1. Field of the Invention

The present invention relates to a display module. More particularly, the present invention relates to a display module having a fingerprint sensor.

2. Description of Related Art

Fingerprint identification is an extensively applied biometric identification technology. To verify one's claimed identity, images of his or her fingerprints are first collected, and the fingerprint images are then measured and compared by means of identification software. Currently, various products are equipped with the function of fingerprint identification, such as notebook computers, cellular phones, portable hard drives, mobile phones, and so on. Since swirls on people's fingerprints are unique, the fingerprints can be characterized and used for authentication as a security mechanism. Moreover, the fingerprint identification technology can also be applied in an access control security system for identifying the user and validating access.

Figure 1:
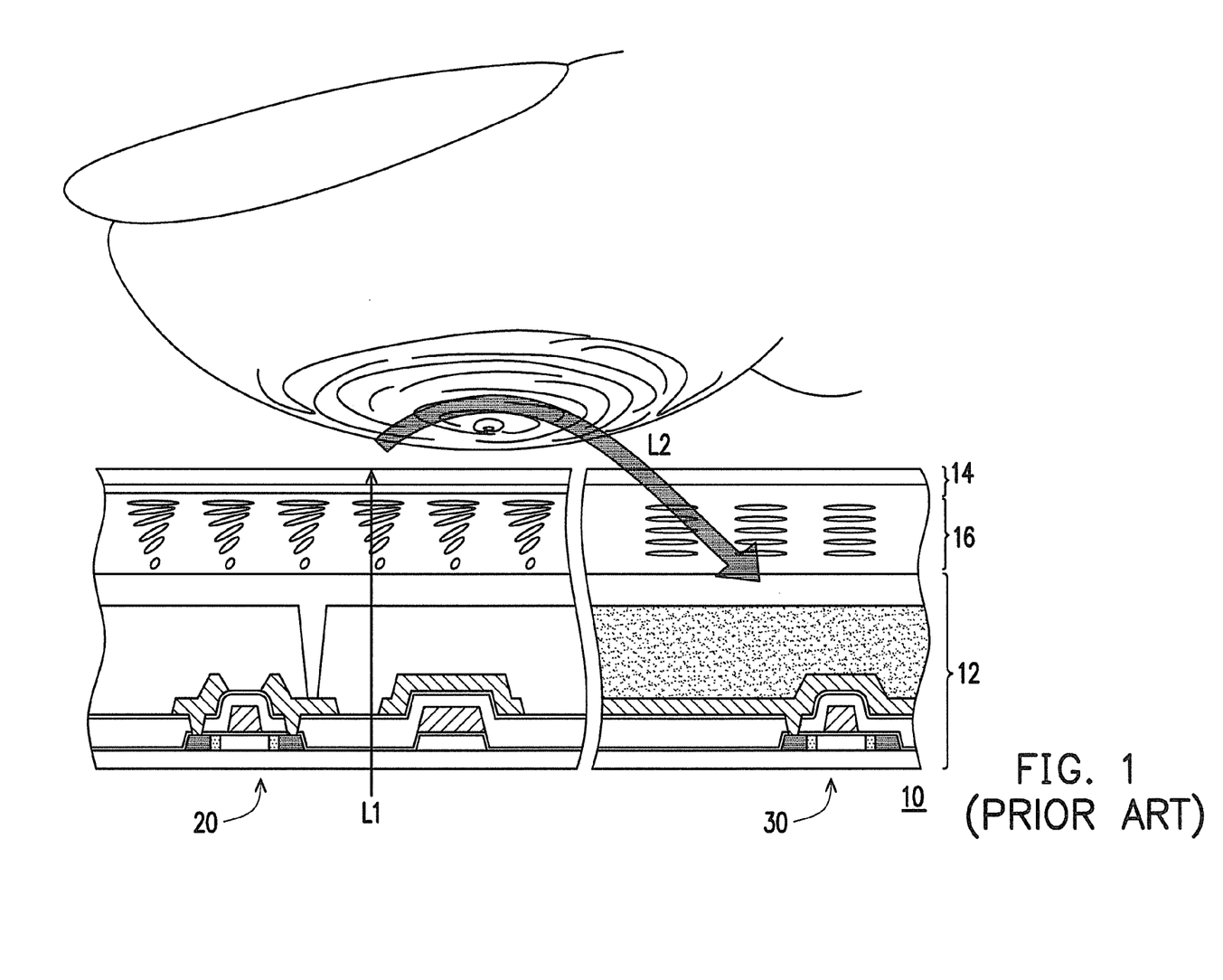
FIG. 1 is a schematic view illustrating light reflection when an LCD panel is covered by a user's finger according to the pertinent art.

FIG. 1 is a schematic view illustrating light reflection when a liquid crystal display (LCD) panel is covered by a user's finger according to the pertinent art. Referring to FIG. 1, a conventional LCD panel 10 includes an active device array substrate 12, an opposite substrate 14, and a liquid crystal layer 16. The active device array substrate 12 includes a display unit 20 and a photosensor 30. When the LCD panel 10 is covered by a user's finger, the finger is irradiated by a backlight source L1 of a backlight module (not shown), and a light L2 is reflected by the finger to the photosensor 30 in the active device array substrate 12. Here, the reflected light L2 is absorbed by the photosensor 30 and thereby generates a photoelectric current. Next, the photoelectric current detected by an external integrator is converted into a voltage. Finally, an output voltage signal is converted in an analog-to-digital manner and undergoes appropriate image processing, such that fingerprint identification is completed.

Nonetheless, the conventional photosensor 30 is configured on the active device array substrate 12 in the LCD panel 10. Therefore, the light L2 reflected by the finger must pass through the opposite substrate 14, the liquid crystal layer 16, and the active device array substrate 12 and is then transmitted to the photosensor 30. Here, the reflected light L2 absorbed by the photosensor 30 is relatively reduced to a great extent after reflected or absorbed by several substrates. As such, the photoelectric current generated by the photosensor 30 is decreased, and the photosensor 30 is less capable of performing the function of identification due to the decreased photoelectric current.

SUMMARY OF THE INVENTION

The present invention is directed to a display module capable of increasing imaging resolution of fingerprints.

In the present invention, a display module including a display panel and a fingerprint sensor is provided. The display panel having a display region and a peripheral region disposed next to the display region includes an active device array substrate, and an opposite substrate. The fingerprint sensor is disposed in the peripheral region of the active device array substrate of the display panel. Besides, the fingerprint sensor includes a light guide element, a light source, and a photosensor array. The photosensor array is disposed on the active device array substrate. The light guide element is disposed over the photosensor array. The light source is disposed on a side surface of the light guide element or below the light guide element.

According to an embodiment of the present invention, a bottom of the light guide element of the fingerprint sensor is in an arc shape.

According to an embodiment of the present invention, a plurality of microstructures is disposed at a bottom of the light guide element of the fingerprint sensor.

According to an embodiment of the present invention, a density of the microstructures is gradually increased from near the light source to far from the light source.

According to an embodiment of the present invention, a gap exists between the light guide element and the photosensor array.

According to an embodiment of the present invention, the light guide element has an upper portion and a lower portion, and a width of the lower portion is greater than a width of the upper portion.

According to an embodiment of the present invention, the light guide element has an upper portion, a lower portion, and a middle portion interposed between the upper portion and the lower portion, and a width of the middle portion is greater than a width of the upper portion and a width of the lower portion.

According to an embodiment of the present invention, the light guide element is a bar-shaped light guide element.

According to an embodiment of the present invention, the light source is disposed at an end of the bar-shaped light guide element.

According to an embodiment of the present invention, the other end of the bar-shaped light guide element is covered by a reflection layer.

According to an embodiment of the present invention, an end of the bar-shaped light guide element has a chamfered structure on which a reflection layer is disposed, and light supplied by the light source is reflected by the reflection layer and is incident to the light guide element.

According to an embodiment of the present invention, the light source is a light emitting diode (LED).

According to an embodiment of the present invention, the photosensor array includes a thin film photosensor array.

According to an embodiment of the present invention, the photosensor array is linearly arranged below the light guide element.

According to an embodiment of the present invention, at least one driving circuit is disposed in the peripheral region of the display panel, and the fingerprint sensor and the at least one driving circuit are disposed at different sides of the peripheral region.

According to an embodiment of the present invention, at least one driving circuit is disposed in the peripheral region of the display panel, and the fingerprint sensor and the at least one driving circuit are disposed at the same side of the peripheral region.

According to an embodiment of the present invention, the display module includes a backlight module. The backlight module is disposed below the display panel and the fingerprint sensor.

According to an embodiment of the present invention, the opposite substrate is a color array substrate.

According to an embodiment of the present invention, the display panel includes a liquid crystal layer. The liquid crystal layer is disposed between the active device array substrate and the color array substrate.

In light of the foregoing, the fingerprint sensor of the present invention is disposed in the peripheral region of the display panel. In comparison with a conventional fingerprint sensor disposed in the active device array substrate, the photosensor array of the display module in the present invention is able to induce a relatively great photoelectric current when the finger is directly scanned by the fingerprint sensor. As such, the imaging resolution the fingerprints can be increased.

In order to make the above and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
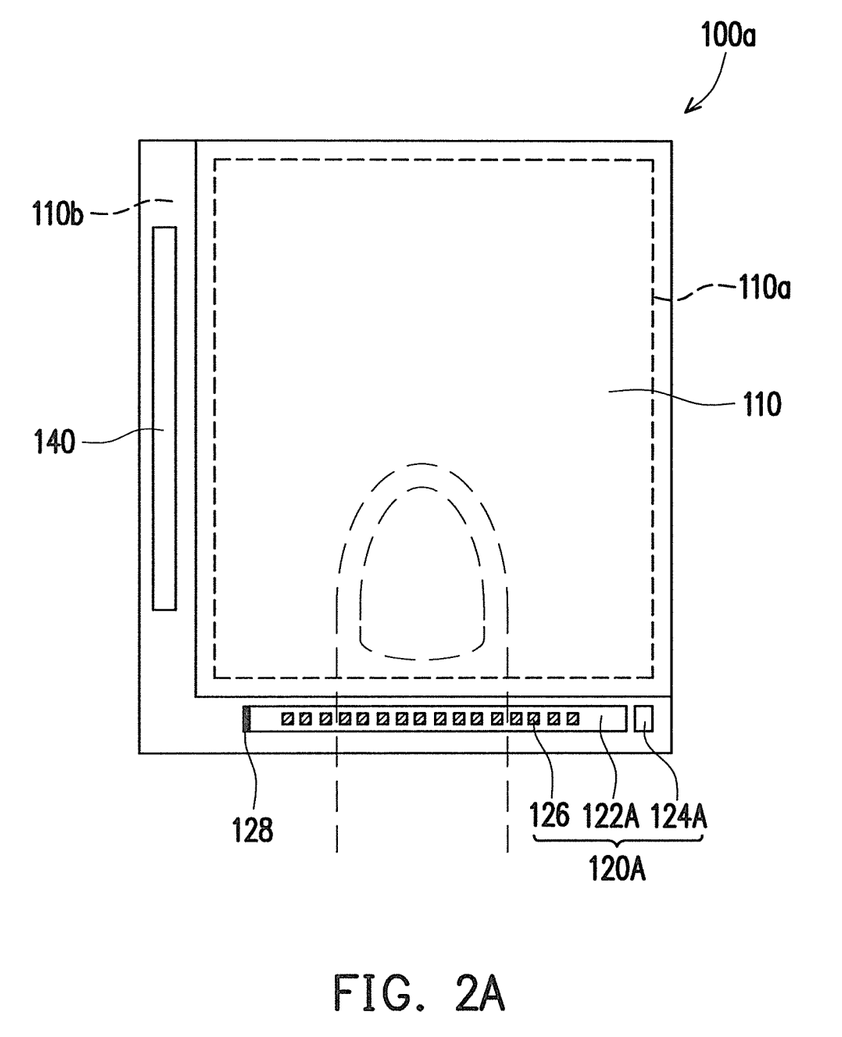
FIG. 2A is a schematic top view of a display module covered by a user's finger according to an embodiment of the present invention.
Figure 2B:
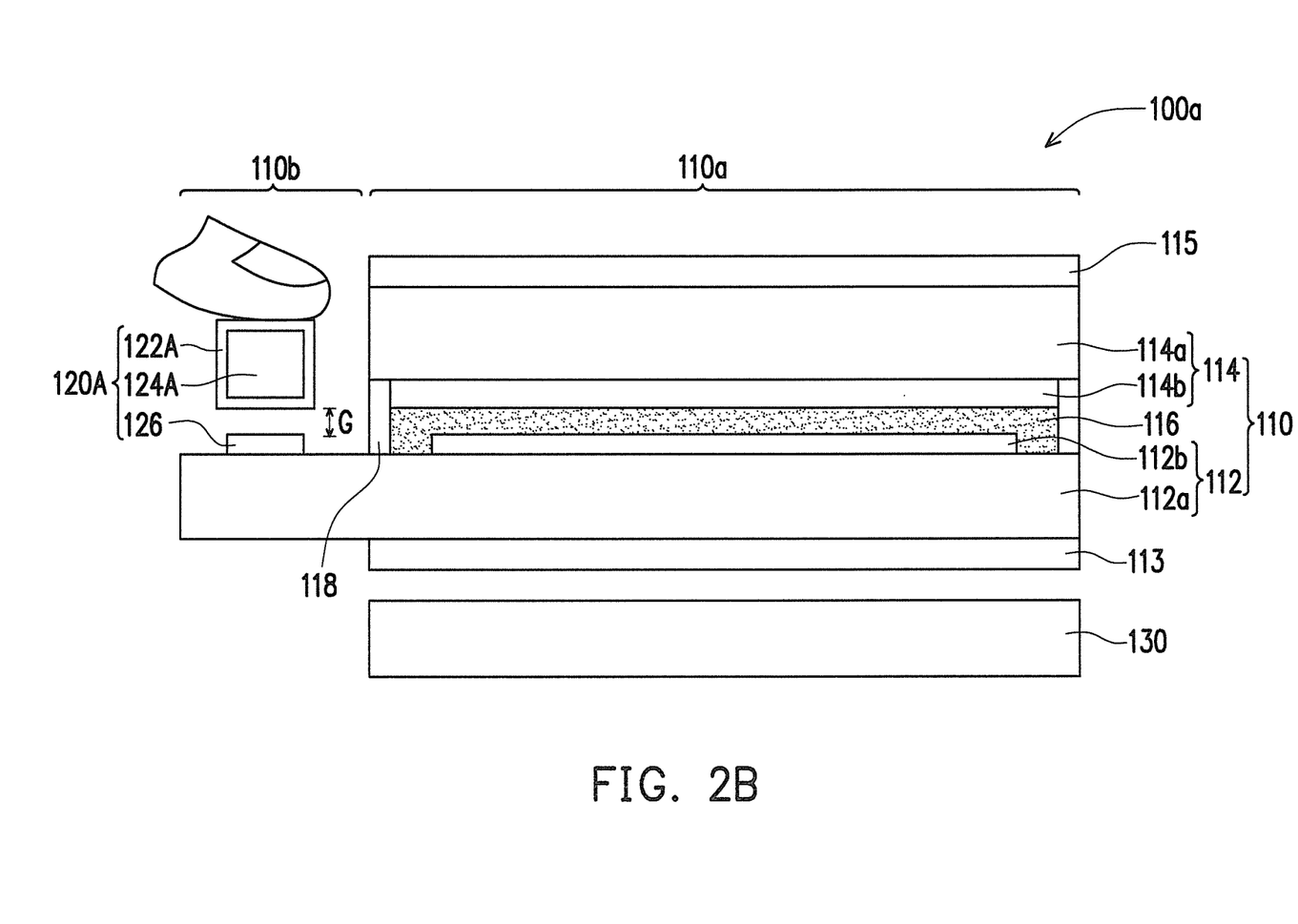
FIG. 2B is a schematic side view of the display module depicted in FIG. 2A.

FIG. 2A is a schematic top view of a display module covered by a user's finger according to an embodiment of the present invention. FIG. 2B is a schematic side view of the display module depicted in FIG. 2A. Referring to FIGS. 2A and 2B, in the present embodiment, a display module 100a includes a display panel 110 and a fingerprint sensor 120A. The display panel 110 includes a display region 110a and a peripheral region 110b disposed next to the display region 110a. The fingerprint sensor 120A is disposed in the peripheral region 110b of the display panel 110, and the fingerprint sensor 120A includes a light guide element 122A, a light source 124A, and a photosensor array 126.

Specifically, in the present embodiment, the display panel 110 is, for example, an LCD panel including an active device array substrate 112, an opposite substrate 114, a liquid crystal layer 116, and a sealant 118. In another embodiment, the display panel 110 includes an upper polarizer 115 and a lower polarizer 113. The active device array substrate 112 is, for example, a thin film transistor (TFT) array substrate that includes a substrate 112a and an active device array 112b. The fingerprint sensor 120A is disposed in the peripheral region 110b of the active device array substrate 112. In other words, the fingerprint sensor 120A is disposed at a side of the active device array substrate 112.

The opposite substrate 114 is disposed opposite to the active device array substrate 112 and includes a substrate 114a and a color array 114b. That is to say, the opposite substrate 114 is a color array substrate. Additionally, the sealant 118 is disposed between the active device array substrate 112 and the opposite substrate 114. The liquid crystal layer 116 is disposed in a space encircled by the active device array substrate 112, the opposite substrate 114, and the sealant 118.

The light guide element 122A of the fingerprint sensor 120A is disposed in the peripheral region 110b of the display panel 100a. Here, the light guide element 122A is, for example, a bar-shaped light guide element of which an end is covered by a reflection layer 128 for reflecting light. Besides, a plurality of microstructures (not shown) is disposed at a bottom of the light guide element 122A. A density of the microstructures is gradually increased from near the light source 124A to far from the light source 124A. Thereby, light is more likely to be reflected and focused, and the light energy obtained by the photosensor array 126 can be uniformly distributed to a better degree. In the present embodiment, the light guide element 122A is, for example, made of glass, polymethylmethacrylate (PMMA), or other transparent light-guiding materials for guiding the light.

The light source 124A is disposed on a side surface of the light guide element 122A. In particular, the light source 124A is disposed at one end of the bar-shaped light guide element 122A, and the reflection layer 128 is opposite to the light source 124A. Namely, the reflection layer 128 is disposed at the other end of the bar-shaped light guide element 122A for reflecting the light supplied by the light source 124A to the light guide element 122A, so as to raise a light utilization rate. In the present embodiment, the light source 124A is, for example, a white light LED, a blue light LED, or an ultraviolet light LED.

The photosensor array 126 is disposed on the substrate 112a of the active device array substrate 112. The light guide element 122A is disposed over the photosensor array 126. The light source 124A is disposed on a side surface of the light guide element 122A. Here, the photosensor array 126 is linearly arranged below the light guide element 122A, and a gap G exists between the light guide element 122A and the photosensor array 126. In the present embodiment, the photosensor array 126 includes a thin film photosensor array.

Figure 2C:
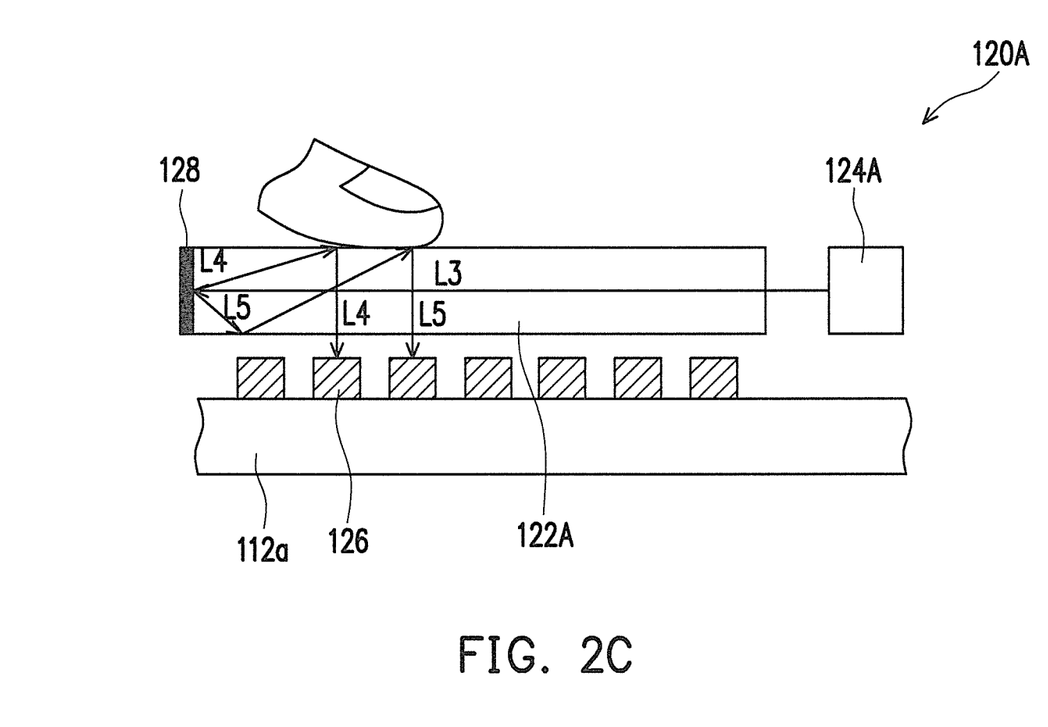
FIG. 2C is a schematic enlarged view of light reflection when a user's finger is scanned by a fingerprint sensor.

FIG. 2C is a schematic enlarged view of light reflection when a user's finger is scanned by a fingerprint sensor. Referring to FIG. 2C, as the finger is scanned by the fingerprint sensor 120A, the light source 124A emits a light L3 into the light guide element 122A, and the light L3 is reflected by the reflection layer 128, such that a light L4 and a light L5 are generated. Next, the light L4 and the light L5 are transmitted by the light guide element 122A to the finger. Thereafter, the light L4 and the light L5 are reflected by the finger to the photosensor array 126. Here, the light L4 and the light L5 are absorbed by the photosensor array 126, and a photoelectric current is then generated. After that, the photoelectric current detected by an external integrator is converted into a voltage. Finally, an output voltage signal is converted in an analog-to-digital manner and undergoes appropriate image processing, such that fingerprint identification is completed.

Figure 2D:
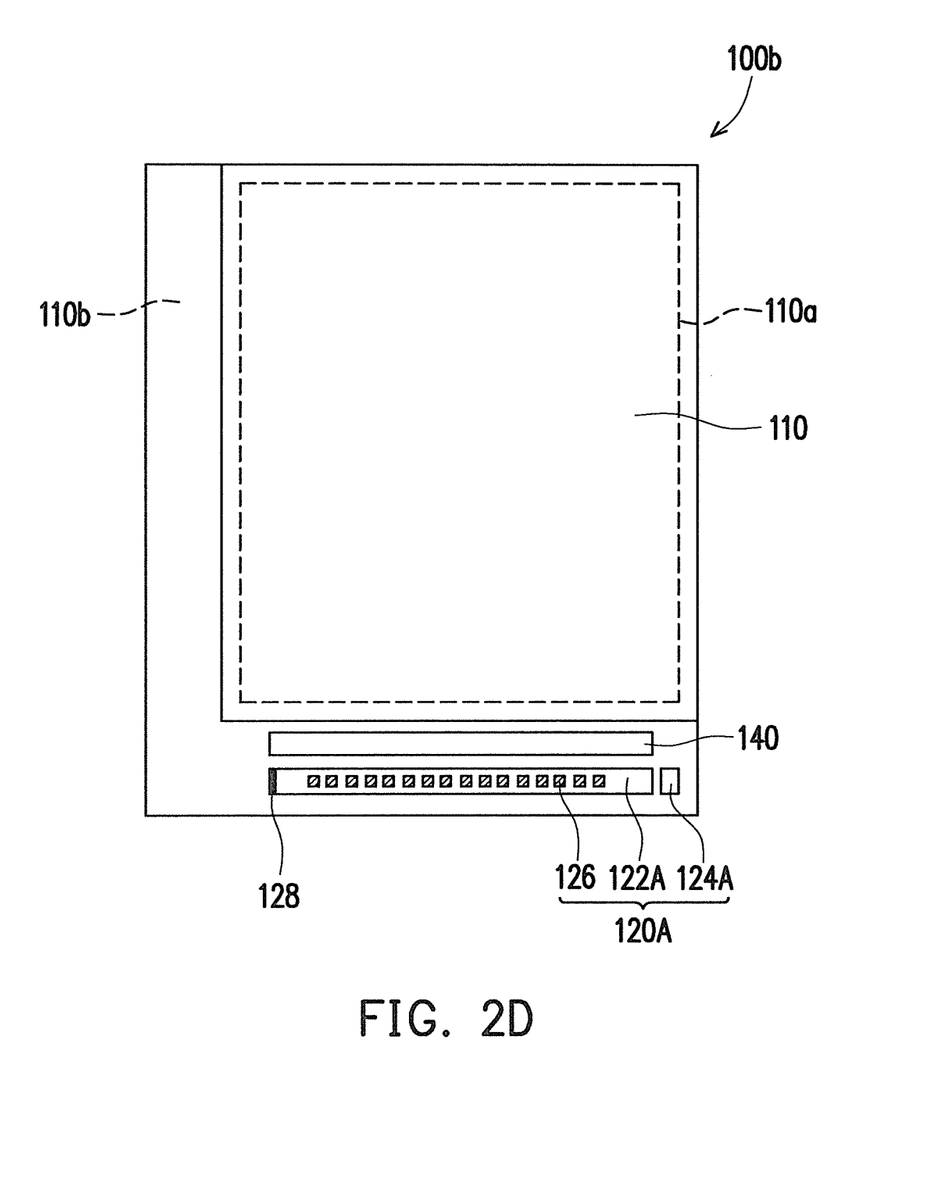
FIG. 2D is a schematic top view of a display module according to another embodiment of the present invention.

Referring to FIGS. 2A and 2B, in the present embodiment, at least a driving circuit 140 is disposed in the peripheral region 110b of the display panel 110. As indicated in FIG. 2A, the fingerprint sensor 120A and the driving circuit 140 can be disposed at different sides of the peripheral region 110b. Note that only one embodiment demonstrating a relative position of the fingerprint sensor 120A and the driving circuit 140 is depicted in FIG. 2A. In other embodiments, the fingerprint sensor 120A and the driving circuit 140 of a display module 100b can also be disposed at the same side of the peripheral region 110b, as shown in FIG. 2D.

Figure 2E:
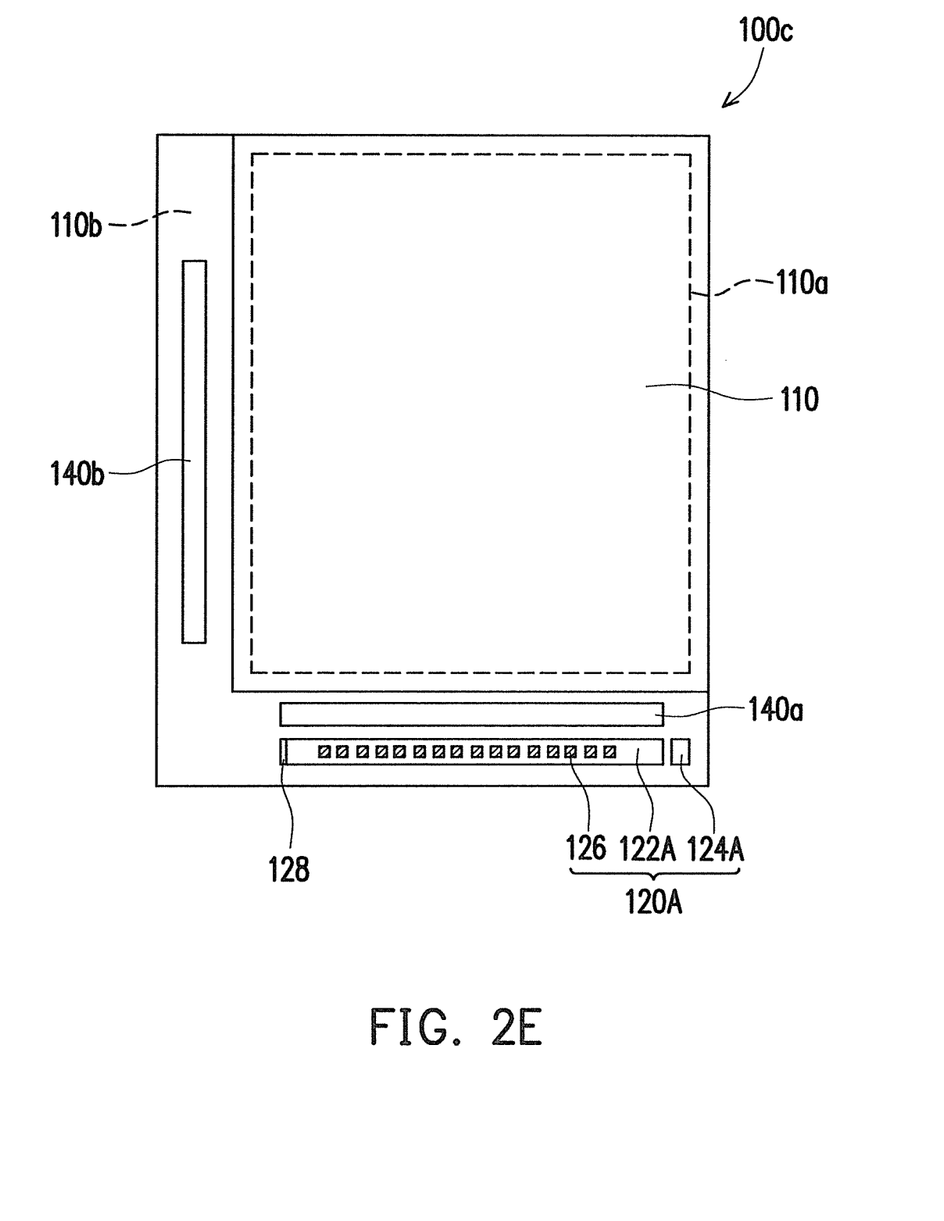
FIG. 2E is a schematic top view of a display module according to still another embodiment of the present invention.

Certainly, in another embodiment, a display module 100c can also have a plurality of driving circuits, for example, two driving circuits 140a and 140b. Here, the driving circuit 140a and the fingerprint sensor 120A are disposed at the same side of the peripheral region 110b, while the other driving circuit 140b is disposed at different side of the peripheral region 110b as shown in FIG. 2E, which still belongs to a technical means adoptable in the present invention and falls within the protection scope of the present invention.

Figure 2F:
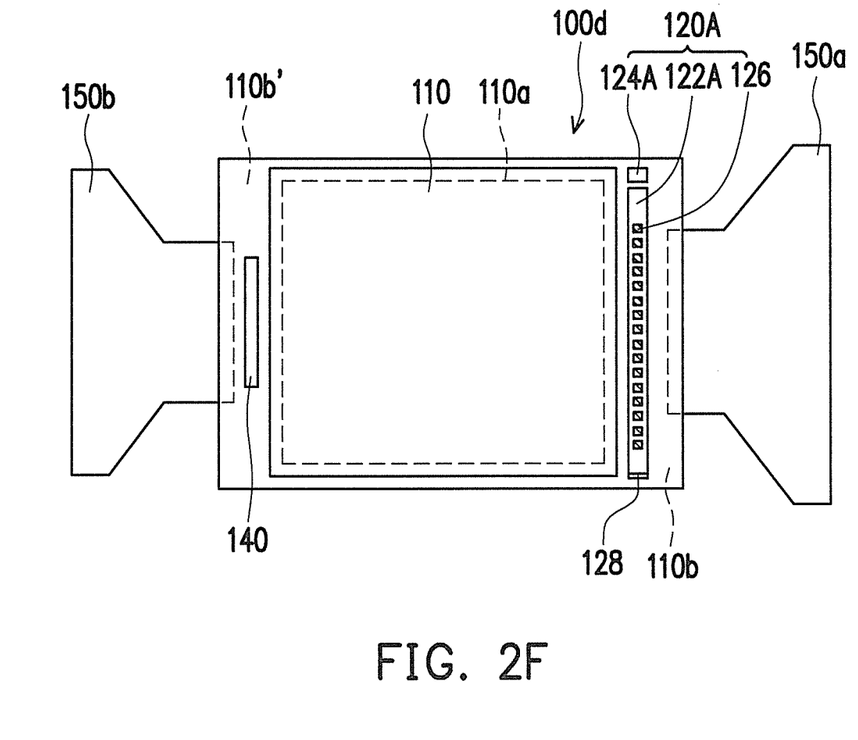
FIG. 2F is a schematic top view of a display module according to yet still another embodiment of the present invention.

Additionally, in still another embodiment, the fingerprint sensor 120A and the driving circuit 140 of a display module 100d can be respectively disposed in the peripheral region 110b at opposite sides of the display panel 110. Besides, the display module 100d can also have a plurality of flexible printed circuit (FPC) boards, for example, two FPC boards 150a and 150b. The FPC board 150a and the fingerprint sensor 120A are disposed at the same side of the peripheral region 110b, while the other FPC board 150b and the driving circuit 140 are disposed at the same side of a peripheral region 110b', as indicated in FIG. 2F. Said embodiment still belongs to a technical means adoptable in the present invention and falls within the protection scope of the present invention.

Moreover, the display module 100a of the present embodiment includes a backlight module 130. The backlight module 130 is disposed below the display panel 110 and the fingerprint sensor 120A. Here, the backlight module 130 is, for example, a side incident type backlight module or a direct type backlight module. In general, the backlight module 130 provides a light source required by the display panel 110, so as to allow the display module 100a to achieve a display function.

Figure 2G:
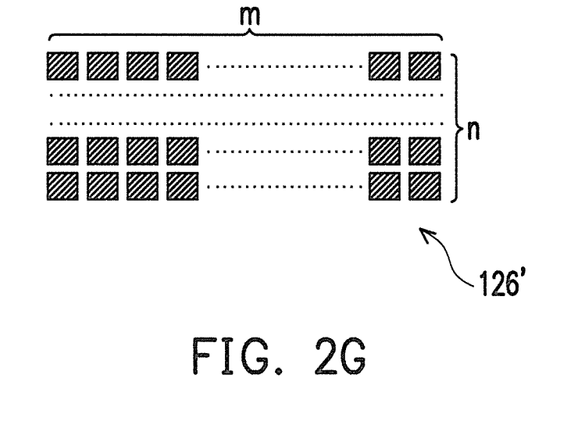
FIG. 2G is a schematic view of a photosensor array according to another embodiment of the present invention.

It should be noted that the photosensor array 126 is not limited to be in a certain form according to the present invention. In FIGS. 2A, 2D, 2E, and 2F, the photosensor array 126 is specifically designed to be a (16×1) array, while a photosensor array 126' in another embodiment can be a (m×n) array, wherein m ranges from 100 to 1000, and n ranges from 1 to 32 as shown in FIG. 2G, which still belongs to a technical means adoptable in the present invention and falls within the protection scope of the present invention.

In brief, the fingerprint sensor 120A of the display module 100a is disposed in the peripheral region 110b of the display panel 110 according to the present embodiment. Therefore, when the finger is scanned by the fingerprint sensor 120A, the finger can be irradiated by the light L4 and the light L5 supplied by the light source 124 through the light guide element 122A, and the finger can directly reflect the light L4 and the light L5 to the photosensor array 126, so as to generate the photoelectric current. In the pertinent art, the photosensor 30 is disposed in the display region of the display panel 10 (as shown in FIG. 1). By contrast, the photosensor array 126 of the display module 100 in the present invention is able to generate a relatively great photoelectric current, such that the imaging resolution achieved by the fingerprint sensor 120A is increased.

Moreover, the fingerprint sensor 120A of the present embodiment is disposed in the peripheral region 110b of the display panel 110 rather than disposed in the display region of the active device array substrate 112. Hence, compared with the pertinent art, the present embodiment teaches the fingerprint sensor 120A that is not affected by peripheral circuits in the active device array substrate 112. Namely, the fingerprint sensor 120A of the present embodiment can be designed individually, and the design of the peripheral circuits of the fingerprint sensor 120A is rather simple. Four different embodiments are provided below to further elaborate the design of fingerprint sensors 120B, 120C, 120D, and 120E.

Figure 3:
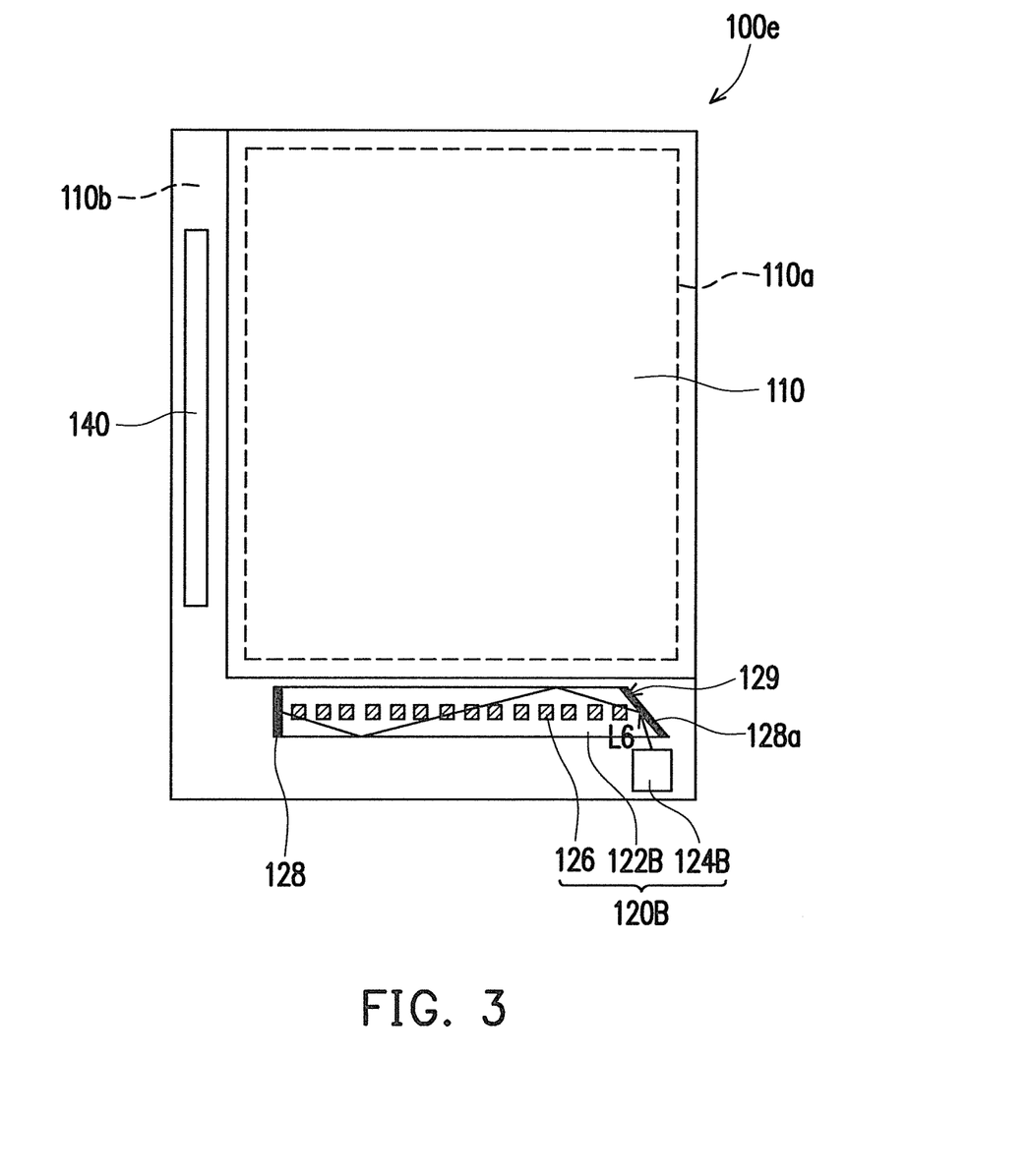
FIG. 3 is a schematic top view of a display module covered by a user's finger according to another embodiment of the present invention.

FIG. 3 is a schematic top view of a display module according to another embodiment of the present invention. Referring to FIG. 3, a light guide element 122B of the fingerprint sensor 120B in a display module 100e is a bar-shaped light guide element of which an end has a chamfered structure 129. A reflection layer 128a is disposed on the chamfered structure 129. Light supplied by a light source 124B is reflected by the reflection layer 128a and is then transmitted by the light guide element 122B. The light source 124B is disposed near the end with the chamfered structure 129.

In detail, according to the present embodiment, the light source 124B and the light guide element 122B are juxtaposed in the same peripheral region 110b, and the light guide element 122B is interposed between the display panel 110 and the light source 124B. The chamfered structure 129 of the light guide element 122B is first irradiated by the light L6 emitted from the light source 124B, and the light L6 is reflected by the reflection layer 128a disposed on the chamfered structure 129, such that the reflected light L6 is transmitted within the light guide element 122B. Thereafter, the reflected light L6 in the light guide element 122B is emitted to the finger. That is to say, the light L6 supplied by the light source 124B is emitted to the finger after reflected by the reflection layer 128 and the reflection layer 128a on the chamfered structure 129. Through repetitive reflections by the reflection layer 128 and the reflection layer 128a on the chamfered structure 129, the utilization rate of the light L6 is increased.

Figure 4:
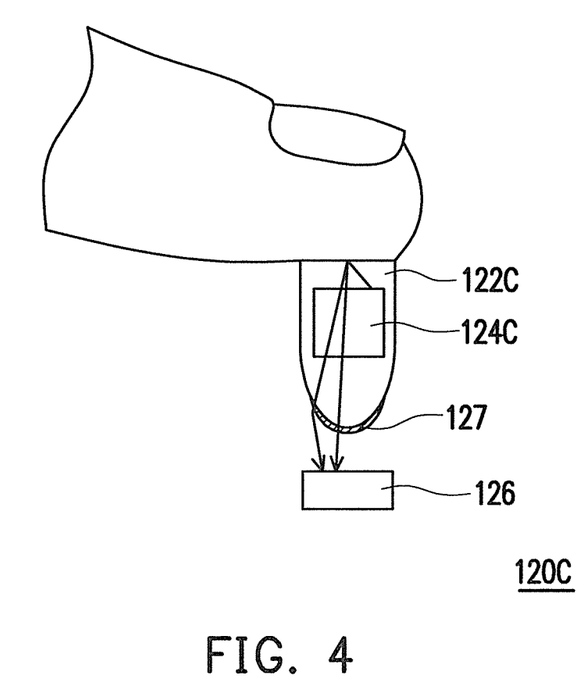
FIG. 4 is a schematic side view of a fingerprint sensor covered by a user's finger according to another embodiment of the present invention.

FIG. 4 is a schematic side view of a fingerprint sensor covered by a user's finger according to still another embodiment of the present invention. Referring to FIG. 4, a bottom of a light guide element 122C of the fingerprint sensor 120C is in an arc shape, and a plurality of microstructures 127 is disposed at the bottom of the light guide element 122C. A density of the microstructures 127 is gradually increased from near a light source 124C to far from the light source 124C, such that the light is more likely to be reflected and focused.

Figure 5:
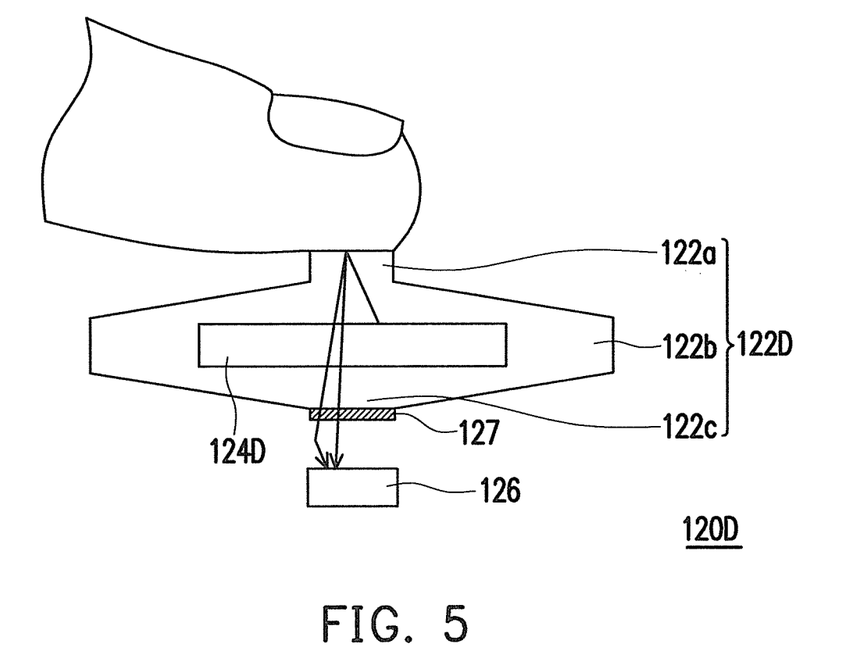
FIG. 5 is a schematic side view of a fingerprint sensor covered by a user's finger according to still another embodiment of the present invention.

FIG. 5 is a schematic side view of a fingerprint sensor covered by a user's finger according to yet still another embodiment of the present invention. Referring to FIG. 5, a light guide element 122D of the fingerprint sensor 120D has an upper portion 122a, a lower portion 122c, and a middle portion 122b interposed between the upper portion 122a and the lower portion 122c. A width of the middle portion 122b is greater than a width of the lower portion 122c and a width of the upper portion 122a.

Particularly, in the present embodiment, a plurality of microstructures 127 are disposed at the bottom of the lower portion 122c of the light guide element 122D of the fingerprint sensor 120D. A density of the microstructures 127 is gradually increased from near a light source 124D to far from the light source 124D, such that the light is more likely to be reflected and focused.

Figure 6:
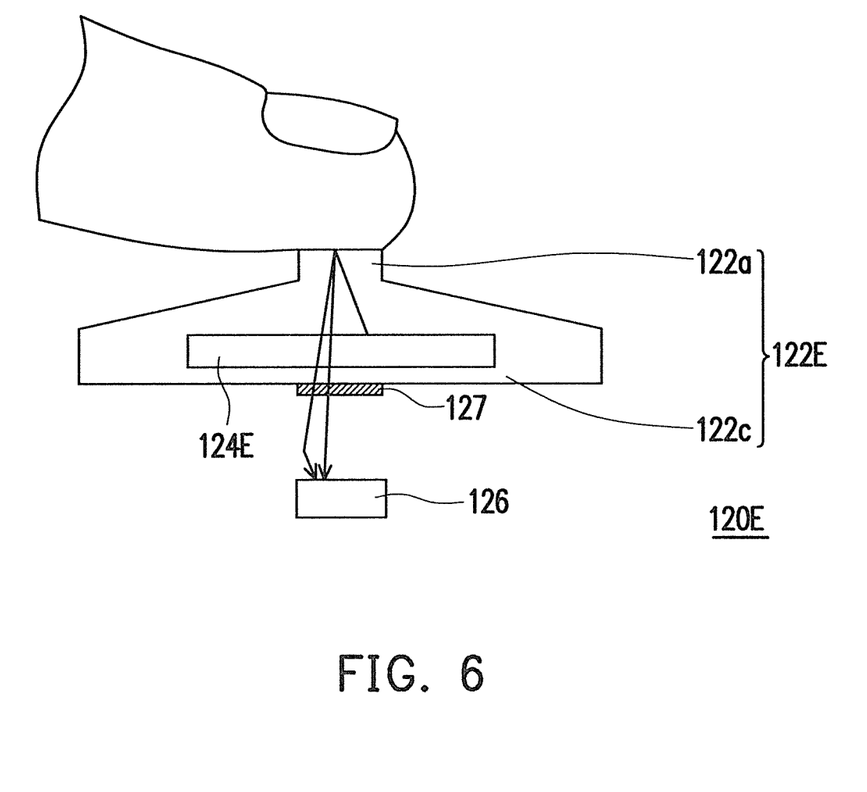
FIG. 6 is a schematic side view of a fingerprint sensor covered by a user's finger according to yet still another embodiment of the present invention.

FIG. 6 is a schematic side view of a fingerprint sensor covered by a user's finger according to yet still another embodiment of the present invention. Referring to FIG. 6, a light guide element 122E of the fingerprint sensor 120E has the upper portion 122a and the lower portion 122c, and the width of the lower portion 122c is greater than the width of the upper portion 122a. Likewise, a plurality of microstructures 127 can also be disposed at the bottom of the lower portion 122c of the light guide element 122E of the fingerprint sensor 120E.

Figure 7:
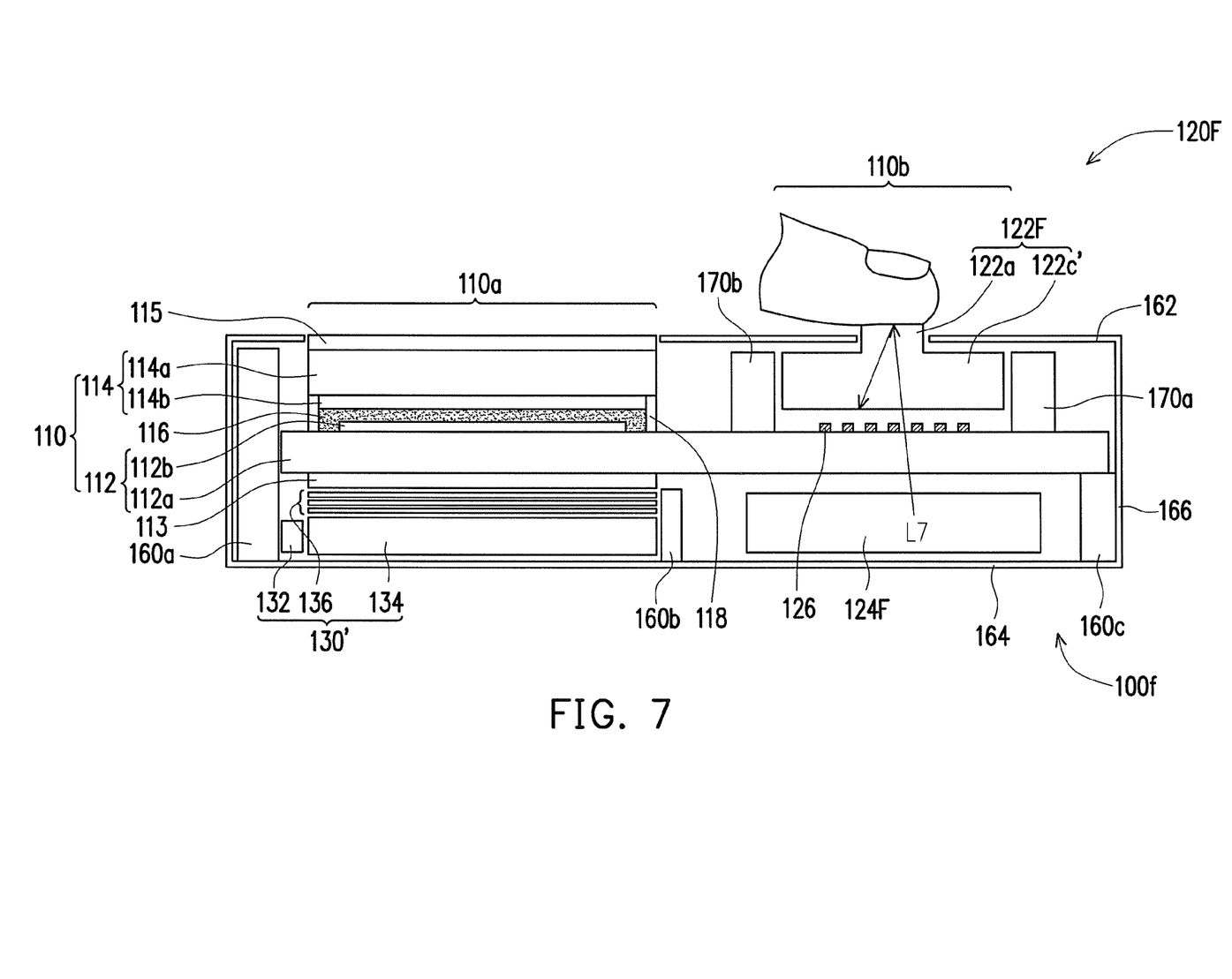
FIG. 7 is a schematic side view of a display module according to another embodiment of the present invention.

FIG. 7 is a schematic side view of a display module according to another embodiment of the present invention. As shown in FIG. 7, a light source 124F is disposed below a light guide element 122F.

In detail, according to the present embodiment, the light source 124F is disposed below the light guide element 122F and at a side of a backlight module 130'. The backlight module 130' is disposed below the display panel 110 and includes a light emitting element 132, a light guide plate 134, and a plurality of optical films 136. The backlight module 130' and the light source 124F are fixed onto a lower frame 164 by means of frames 160a, 160b, and 160c. The light guide element 122F is positioned at a side of the active device array substrate 112 and an upper frame 162 by means of supporting members 170a and 170b disposed at respective sides of the light guide element 122F. A side frame 166 connects the upper frame 162 and the lower frame 164, and a display module 100f is encircled by the upper frame 162, the lower frame 164, and the side frame 166.

As the finger is scanned by a fingerprint sensor 120F, a light L7 supplied by the light source 124F passes through gaps in the photosensor array 126 on the active device array substrate 112 and is then transmitted to the finger. Next, the light L7 is reflected by the finger to the photosensor array 126. Here, the light L7 is absorbed by the photosensor array 126 and thereby generates a photoelectric current. After that, the photoelectric current detected by an external integrator is converted into a voltage. Finally, an output voltage signal is converted in an analog-to-digital manner and undergoes appropriate image processing, such that fingerprint identification is completed.

Based on the above, the fingerprint sensor of the present invention is disposed in the peripheral region of the display panel, and therefore the finger can be directly irradiated by the light supplied by the light source through the light guide element when the finger is scanned by the fingerprint sensor. Moreover, the finger can directly reflect the light to the photosensor array, so as to generate the photoelectric current. In comparison with the conventional fingerprint sensor disposed in the active device array substrate, the photosensor array of the display module in the present invention receives the reflected light that does not penetrate a number of substrates or thin films. Thereby, a relatively great photoelectric current is generated, and the imaging resolution of the fingerprints can be increased. In addition, the fingerprint sensor is disposed in the peripheral region of the display panel, and thus the fingerprint sensor is not affected by the peripheral circuits in the active device array substrate. Namely, the fingerprint sensor of the present invention can be designed individually, and the design of the peripheral circuits of the fingerprint sensor is rather simple.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display module, comprising:
a display panel, having a display region and a peripheral region disposed next to the display region, the display panel comprising an active device array substrate and an opposite substrate, wherein the opposite substrate covers the active device array substrate in the display region and exposes a portion of the active device array substrate in the peripheral region; and
a fingerprint sensor, disposed on the active device array substrate in the peripheral region not covered by the opposite substrate, the fingerprint sensor comprising:
a photosensor array, disposed on the active device array substrate;
a light guide element, disposed over the photosensor array, wherein the light guide element is a bar-shaped light guide element; and
a light source, disposed next to the light guide element, wherein the light source is disposed at an end of the bar-shaped light guide element, and wherein the other end of the bar-shaped light guide element is covered by a reflection layer disposed opposite to the light source to reflect the light from the light source.

2. The display module as claimed in claim 1, wherein the light source is disposed on a side surface of the light guide element.

3. The display module as claimed in claim 1, wherein the light source is disposed below the light guide element.

4. The display module as claimed in claim 1, wherein a bottom of the light guide element is in an arc shape.

5. The display module as claimed in claim 1, wherein a plurality of microstructures is disposed at a bottom of the light guide element.

6. The display module as claimed in claim 5, wherein a density of the microstructures is increased from near the light source to far from the light source.

7. The display module as claimed in claim 1, wherein a gap exists between the light guide element and the photosensor array.

8. The display module as claimed in claim 1, wherein the light guide element has an upper portion and a lower portion, and a width of the lower portion is greater than a width of the upper portion.

9. The display module as claimed in claim 1, wherein the light guide element has an upper portion, a lower portion and a middle portion interposed between the upper portion and the lower portion, and a width of the middle portion is greater than a width of the upper portion and a width of the lower portion.

10. The display module as claimed in claim 1, wherein an end of the bar-shaped light guide element has a chamfered structure, and a reflection layer is disposed on the chamfered structure, and light supplied by the light source is reflected by the reflection layer and is incident to the light guide element.

11. The display module as claimed in claim 1, wherein the light source comprises a light emitting diode.

12. The display module as claimed in claim 1, wherein the photosensor array comprises a thin film photosensor array.

13. The display module as claimed in claim 1, wherein the photosensor array is linearly arranged below the light guide element.

14. The display module as claimed in claim 1, wherein at least one driving circuit is disposed in the peripheral region of the display panel, and the fingerprint sensor and the at least one driving circuit are disposed at different sides of the peripheral region.

15. The display module as claimed in claim 1, wherein at least one driving circuit is disposed in the peripheral region of the display panel, and the fingerprint sensor and the at least one driving circuit are disposed at the same side of the peripheral region.

16. The display module as claimed in claim 1, further comprising a backlight module disposed below the display panel and the fingerprint sensor.

17. The display module as claimed in claim 1, wherein the opposite substrate is a color array substrate.

18. The display module as claimed in claim 17, wherein the display panel comprises a liquid crystal layer interposed between the active device array substrate and the color array substrate.

19. A display module, comprising:
  a display panel, having a display region and a peripheral region disposed next to the display region, the display panel comprising an active device array substrate and an opposite substrate, wherein the active device array substrate comprises an active device array on a substrate in the display region, the opposite substrate covers the active device array and exposes a portion of the substrate in the peripheral region; and
  a fingerprint sensor, disposed on the substrate in the peripheral region not covered by the opposite substrate, the fingerprint sensor comprising:
    a photosensor array, disposed on the substrate, wherein the photosensor array and the active device array are in contact with the same surface of the substrate;
    a light guide element, disposed over the photosensor array, wherein the light guide element is a bar-shaped light guide element; and
    a light source, disposed next to the light guide element, wherein the light source is disposed at an end of the bar-shaped light guide element, and wherein the other end of the bar-shaped light guide element is covered by a reflection layer disposed opposite to the light source to reflect the light from the light source.

20. A display module, comprising:
  a display panel, having a display region and a peripheral region disposed next to the display region, the display panel comprising:
    an active device array substrate;
    an opposite substrate; and
    a sealant, connected between and contact with the active device array substrate and the opposite substrate to form an interior area, wherein the sealant surrounds the interior area; and
  a fingerprint sensor exposed by the opposite substrate, the fingerprint sensor disposed in the peripheral region of the active device array substrate of the display panel and located outside the interior area, the fingerprint sensor comprising:
    a photosensor array, disposed on the active device array substrate;
    a light guide element, disposed over the photosensor array; and
    a light source, disposed next to the light guide element, wherein a plurality of microstructures is disposed at a bottom of the light guide element, and a density of the microstructures is increased from near the light source to far from the light source.

21. The display module as claimed in claim 20, wherein the light source is disposed on a side surface of the light guide element.

22. The display module as claimed in claim 20, wherein the light source is disposed below the light guide element.

23. The display module as claimed in claim 20, wherein a bottom of the light guide element is in an arc shape.

24. The display module as claimed in claim 20, wherein a gap exists between the light guide element and the photosensor array.

25. The display module as claimed in claim 20, wherein the light guide element has an upper portion and a lower portion, and a width of the lower portion is greater than a width of the upper portion.

26. The display module as claimed in claim 20, wherein the light guide element has an upper portion, a lower portion and a middle portion interposed between the upper portion and the lower portion, and a width of the middle portion is greater than a width of the upper portion and a width of the lower portion.

27. The display module as claimed in claim 20, wherein the light guide element is a bar-shaped light guide element, the light source is disposed at an end of the bar-shaped light guide element, and the other end of the bar-shaped light guide element is covered by a reflection layer.

28. The display module as claimed in claim 20, wherein the light guide element is a bar-shaped light guide element, an end of the bar- shaped light guide element has a chamfered structure, and a reflection layer is disposed on the chamfered structure, and light supplied by the light source is reflected by the reflection layer and is incident to the light guide element.

29. The display module as claimed in claim 20, wherein the light source comprises a light emitting diode, and the photosensor array comprises a thin film photosensor array.

30. The display module as claimed in claim 20, wherein the photosensor array is linearly arranged below the light guide element.

31. The display module as claimed in claim 20, wherein at least one driving circuit is disposed in the peripheral region of the display panel, and the fingerprint sensor and the at least one driving circuit are disposed at different sides of the peripheral region.

32. The display module as claimed in claim 20, wherein at least one driving circuit is disposed in the peripheral region of the display panel, and the fingerprint sensor and the at least one driving circuit are disposed at the same side of the peripheral region.

33. The display module as claimed in claim 20, further comprising a backlight module disposed below the display panel and the fingerprint sensor.

34. The display module as claimed in claim 20, wherein the opposite substrate is a color array substrate, and the display panel comprises a liquid crystal layer interposed between the active device array substrate and the color array substrate.

35. A display module, comprising:
  a display panel, having a display region and a peripheral region disposed next to the display region, the display panel comprising an active device array substrate, a sealant and an opposite substrate, wherein the sealant is located between the active array substrate and the opposite substrate to form an interior area; and a fingerprint sensor, disposed in the peripheral region of the active device array substrate of the display panel and located outside the interior area, the fingerprint sensor comprising:
  a photosensor array, disposed on the active device array substrate;
  a light guide element, disposed over the photosensor array, wherein the light guide element is a bar-shaped light guide element; and
  a light source, disposed next to the light guide element, wherein the light source is disposed at an end of the bar-shaped light guide element, and wherein the other end of the bar-shaped light guide element is covered by a reflection layer disposed opposite to the light source to reflect the light from the light source.

* * * * *